Oct. 5, 1965
H. DEARDORF
3,210,033
SUPPORTING OR HOLDING STRAP OR CLAMP FOR CABLES AND THE LIKE
Filed May 27, 1963
2 Sheets-Sheet 1
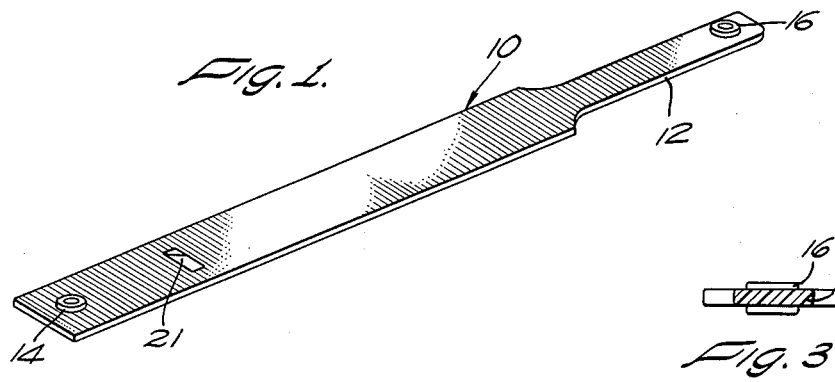
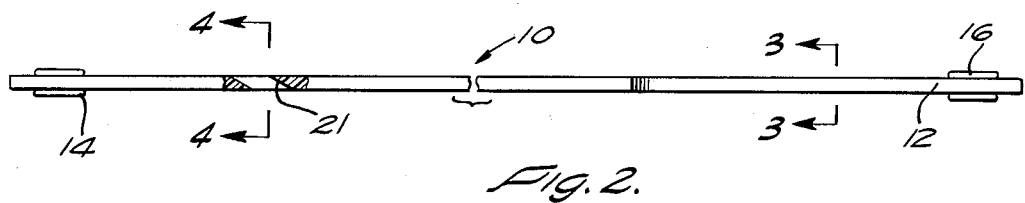
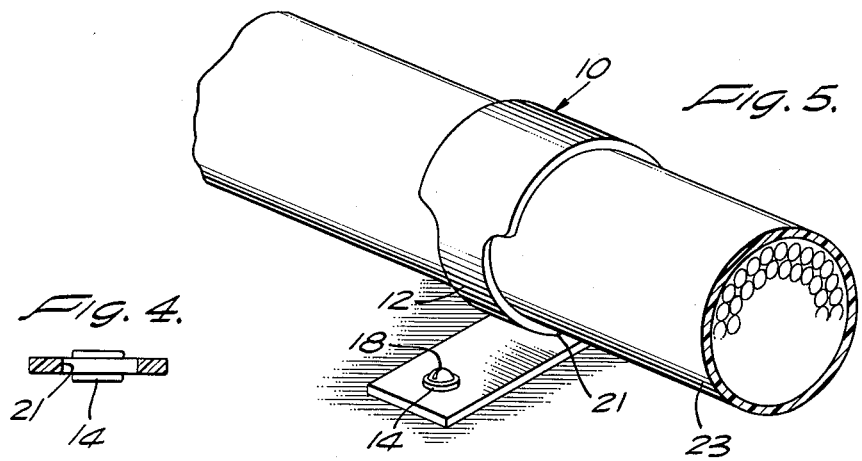
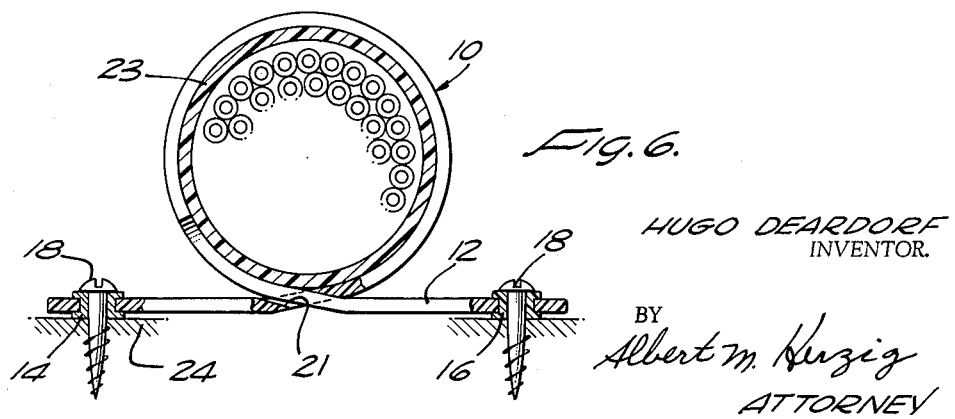
HUGO DEARDORF
INVENTOR.
BY
Albert M. Herzig
ATTORNEY

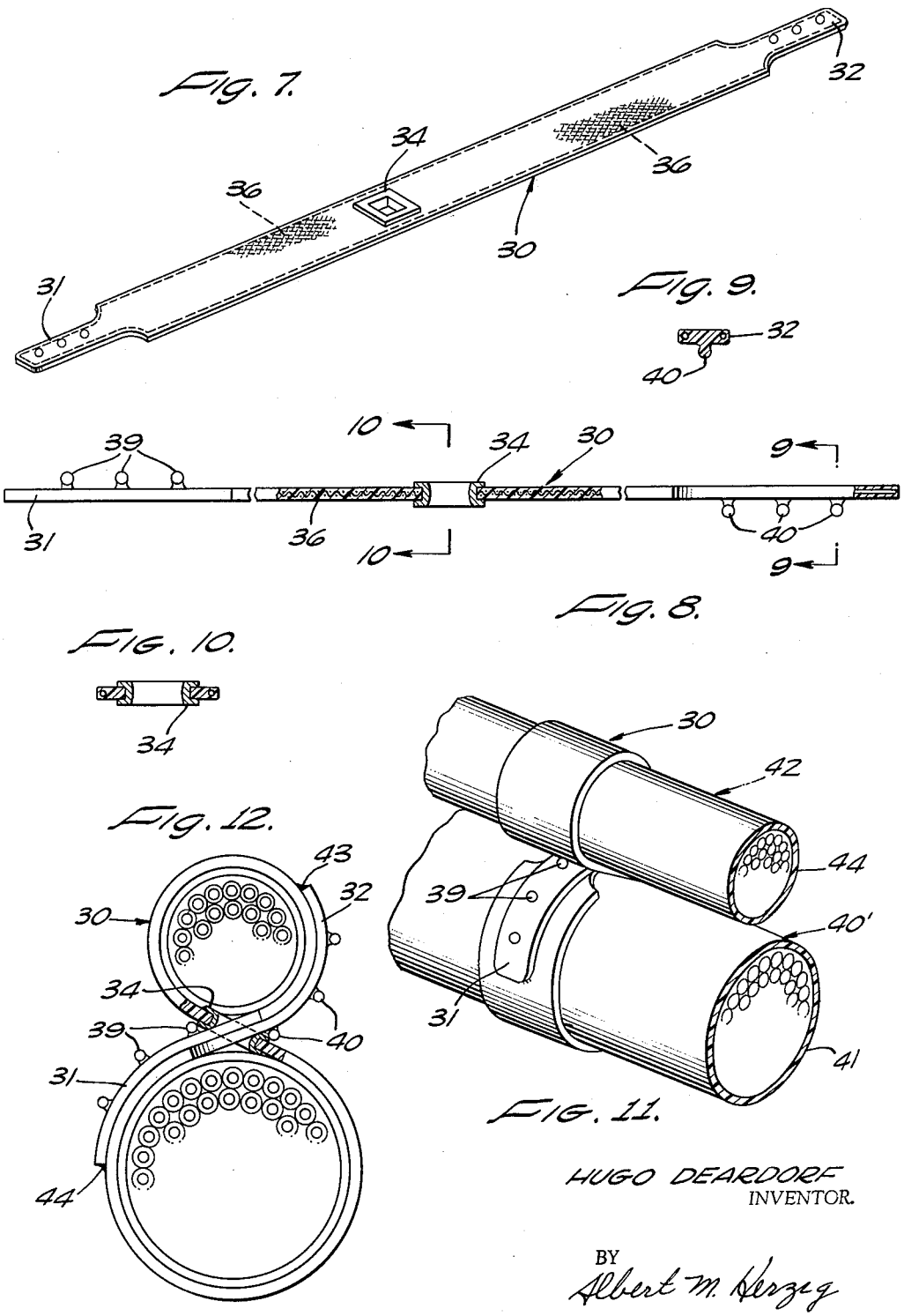

United States Patent Office 3,210,033
Patented Oct. 5, 1965

3,210,033
SUPPORTING OR HOLDING STRAP OR CLAMP FOR CABLES AND THE LIKE
Hugo Deardorf, 1037 Mar Vista, Whittier, Calif.
Filed May 27, 1963, Ser. No. 283,633
2 Claims. (Cl. 248—74)

This invention relates to a holding strap or clamp supporting and holding elements such as electrical cables, conduits, pipes and the like.

In one embodiment of the invention it takes the form of a strap preferably formed of plastic having an intermediate slanted opening through which one end of the strap can be passed after it has been passed around the conduit or pipe to be clamped or held. The strap is provided with grommets in both ends for attaching it or fastening it by nails or screws. In this way, an extremely simplified, but yet effective holding strap or clamp is provided, which is adjustable to any size of conduit or cable, and which provides an extremely simple but effective holding device.

In another form, the invention provides an answer to the problem of attaching or fastening cables, such as electrical cables, to a messenger cable. In the past metal clamps have been used which have been subject to the deficiency that when exposed to wind there is movement and the metal clamps cut into the cables, such as cables having plastic coverings which deteriorates and eventually destroys the cables. In this embodiment of the invention there is provided a strap holding member having an intermediate grommet. The strap passes around the multiple wire electrical conduit and around the messenger cable with each end of the strap passing through the intermediate grommet in the strap in a position between the cables. The strap is provided with balls attached to the surfaces thereof near the ends which engage with the grommet and act as holding devices to hold the strap secure. The ends beyond the grommet may be fastened down by being glued or the like.

The primary object of the invention is to provide an improved and simplified holding strap or clamp for cables which is effective, easy to fabricate and easy to install.

Another object is to provide a holding strap of the type referred to in the previous object having an intermediate opening extending on a slant through the strap, one end of the strap being narrowed so as to pass through the opening whereby the strap can be fitted around a conduit or cable and the ends fastened down by nails or screws extending through grommets in the end of the strap.

Another object is to provide a holding scrap adapted for fastening or clamping a multi-conductor electrical cable to a messenger cable, the strap having an intermediate grommet and parts to pass around both the multi-conductor cable and the messenger cable, with the ends extended through the intermediate grommet in a position between the cables and held by ball holding devices on the ends of the cable.

Further objects and additional advantages of the invention will become apparent from the following detailed description and annexed drawings wherein:

FIGURE 1 is a perspective view of one form of the invention;
FIGURE 2 is a side elevation view of the form of the invention shown in FIGURE 1;
FIGURE 3 is a sectional view taken along the line 3—3 of FIGURE 2;
FIGURE 4 is a sectional view taken along the line 4—4 of FIGURE 2;
FIGURE 5 is a perspective view of the holding strap in position on a cable;
FIGURE 6 is a sectional view of the holding strap in holding position;
FIGURE 7 is a perspective view of another form of the invention;
FIGURE 8 is a side elevation partly in section of the form of the invention shown in FIGURE 7;
FIGURE 9 is a sectional view taken along the line 9—9 of FIGURE 8;
FIGURE 10 is a sectional view taken along the line 10—10 of FIGURE 8;
FIGURE 11 is a perspective view of the strap of FIGURE 7 in position on cables;
FIGURE 12 is an elevational view of the strap of FIGURE 7 in holding position on the cables.

Referring now to FIGURES 1 to 6 of the drawings, the numeral 10 designates a holding strap for holding cables or conduits as will be described. Preferably this strap is made of plastic comprising polyurethane or polyethylene. The strap is flexible, but yet extremely strong and wear resistant. It may be made with metal or wire internal reinforcement, that is the reinforcement surrounded by plastic, or flexible metal surrounded by cooked on plastic.

One end of the strap is designated at 12, is narrowed and in the ends are provided metal grommets 14 and 16 through which may be passed screws or nails as shown at 18 in FIGURES 5 and 6 for holding the strap down or in fastened position. At an intermediate point in the strap there is an opening in the form of a slot 21 which is cut on a slant with respect to the body of the strap, as may be seen in FIGURES 1 and 2.

In use, the strap is wrapped around a cable or conduit as shown at 23 in FIGURE 5 with the narrow end 12 extended through the opening 21. The narrow part 12 is extended through the opening 21 so that the strap or clamp may be adjusted for snugly holding a conduit or cable of any size with the strap in contact with it internally, all the way around, as may be seen in FIGURE 6. The two ends of the strap extend out tangentially from the conduit or cable as shown in FIGURE 6 and may be securely fastened down to a flat surface 24, as shown. By reason of the slant in the opening 21, the strap snugly engages and contacts the conduit or cable 23 entirely around its circumference, as may be observed in FIGURE 6. It engages snugly, and as pointed out, is adjustable to do this with respect to any size of cable or conduit. In this way an extremely effective hold down or clamp device is provided which is not subject to deterioration or other type of fault and requires no maintenance. The straps are easy to fabricate, are economical, and are light and easy to carry and transport.

FIGURES 7 to 11 show another form of the invention, particularly adapted for meeting a vexing problem which has existed in connection with telephone lines and poles. Ordinarily, at each pole there is installed a plastic covered multi-conductor cable and a messenger cable attached together by a metal clamp or clamps. These cables are exposed to movement occasioned by the wind, and when this happens, the metal clamps cut into the cables causing them to deteriorate and possibly to be destroyed. FIGURE 7 shows a strap somewhat similar to that described in connection with the previous embodiment and which may be of similar construction, being made of plastic or plastic reinforced by wire or metal. The strap has end parts 31 and 32 and an intermediate grommet 34 fastened to the strap in a known manner. The reinforcement in the strap shown is in the form of a wire or metal mesh as designated at 36. The narrowed end parts 31 and 32 of the strap have securely attached thereto ball members, as designated at 39 and 40 which may be made of either plastic or metal and which are secured fastened or united to the strap in any known manner such as by being integrally formed therewith or being attached by metal rivets or fasteners.

FIGURES 11 and 12 show by way of example, a multi-conductor electrical cable 40 having a plastic sheath or covering 41. The numeral 42 designates a messenger cable similarly having a plastic sheath or covering 44. These two cables are strapped or clamped together by the strap of FIGURE 7 which wraps around both of them, as shown in these figures. The metal grommet 34 is in a position between the two cables. The narrowed end parts 31 and 32 both pass through the metal grommet 34 contiguously to each other as shown in FIGURE 12. The ends of the strap are held by the balls 39 and 40 engaging with the grommet 34, as shown. In this way the end parts can be drawn taut to any degree of tension with the end parts being held by the balls 39 and 40 engaging the grommet as shown. The strap has sufficient flexibility to allow the balls 39 and 40 to be passed through the grommet when the strap is being installed and thereafter the balls will prevent return movement through the grommet and will hold securely. The end parts of the strap 31 and 32 may be sealed or secured to the part of the strap wrapped around the cables by glue or other holding means, as designated at 43 and 44. As may be seen, therefore, the invention provides a simplified, but extremely effective holding strap for securing for example, a multi-conductor cable to a messenger cable. The strap is extremely strong, but flexible and resilient and forms a holding device which overcomes the deficiencies described above occasioned by metal clamps which will cut into a plastic cable.

From the foregoing, those skilled in the art will observe that the invention achieves and realizes all of the objects and advantages enumerated in the foregoing as well as having many additional advantages which are apparent from the detailed description. The device is a simplified one, but extremely effective, economical, easy to fabricate and easy to install and use.

The foregoing disclosure is representative of preferred forms of the invention and is to be interpreted in an illustrative rather than a limiting sense, the invention to be accorded the full scope of the claims appended hereto.

I claim:

1. A holding device comprising a flexible strap having an intermediate opening therethrough and having at least one narrowed end part configured so as to pass through the said opening with a substantial part of the narrowed end part extending beyond the opening, both of the end parts of the strap having holding means adapted for holding the strap in installed position when it has been wrapped around a cable or conduit, the intermediate opening in the strap including a grommet in the opening, the fastening means at the end of the strap comprising fastening devices adapted to fasten by means of engagement with the said grommet whereby the strap may be passed around both of two adjacent cables with both ends of the strap passed through the grommet and fastened thereto holding the cables in adjacent relationship.

2. A device as in claim 1 wherein the fastening means at the ends of the strap comprise a plurality of spaced projections extending from the surfaces of the narrowed end parts of the strap and adapted to engage and hold when passed through the said grommet.

References Cited by the Examiner

UNITED STATES PATENTS

| 856,099 | 6/07 | Peirce | 248—61 |
| 876,402 | 1/08 | Schacht | 132—44 |
| 890,125 | 6/08 | Crampton | 248—61 |
| 916,673 | 3/09 | Clawson | 248—74 |
| 2,373,328 | 4/45 | Morehouse | 248—74 |
| 2,759,390 | 8/56 | Edwards | 85—40 |
| 2,915,268 | 12/59 | Wrobel | 248—74 |

FOREIGN PATENTS

| 815,606 | 7/59 | Great Britain. |
| 259,578 | 6/49 | Switzerland. |

CLAUDE A. LE ROY, *Primary Examiner.*